Patented Nov. 29, 1938

2,138,609

UNITED STATES PATENT OFFICE 2,138,609

PROCESS FOR HYDROLYZING ORGANIC HALIDES

Albert W. Meyer, Nutley, N. J., assignor to A. O. Smith Corporation, Milwaukee, Wis., a corporation of New York No Drawing. Application November 17, 1937, Serial No. 175,175

10 Claims. (Cl. 260—629)

The invention relates to a process for hydrolyzing organic halides and has particular relation to the production of hydroxy compounds such as phenols and alcohols. This application is a continuation-in-part of application Serial No. 725,077 filed May 11, 1934.

An object of the invention is to provide an improved vapor phase process for the hydrolysis of organic halides.

A more specific object of the invention is to provide an improved vapor phase process for hydrolyzing monochlorbenzene to phenol.

It has previously been proposed to conduct the vapor phase hydrolysis of monochlorbenzene to phenol by passing the reaction mixture of monochlorbenzene and steam over a porous catalyst such as silica gel which may advantageously be impregnated with a metal salt possessed of catalytic activity. Cuprous chloride is an example of a metal salt which has been found to greatly enhance the catalytic activity of silica gel. However, a catalyst formed of silica gel impregnated with cuprous chloride maintains its acitivity for only a short time before it begins to deteriorate. The rate of deterioration will depend upon the temperature, the purity of the silica gel and the gases, and to some extent possibly upon the space velocity or time of contact of the gases with the catalyst. This deterioration of the catalyst is due in part to the deposition of carbon or tarry substances upon the catalyst which gradually decreases its activity. A cause of even more rapid deterioration of such a catalyst is the volatilization of cuprous chloride. This results in leaving behind nothing but plain silica gel which is possessed of much lower catalytic activity than silica gel impregated with cuprous chloride.

It has been suggested in Patent No. 1,884,710 issued October 25, 1932 to R. L. Jenkins et al. that the deleterious effects produced by volatilization of the cuprous chloride could be avoided by passing the vapor mixture of steam and monochlorbenzene over copper just prior to the introduction of the vapors to the catalyst. This passage of the reacting mixture over copper is said to result in the formation of a very small amount of cuprous chloride vapor. This amount is so small that tests made by applicant show the reacting vapor mixture in the Jenkins process is only about two or three per cent saturated with cuprous chloride vapor.

The present invention is based upon the discovery that superior results are obtained by the addition of cuprous chloride vapor to the reaction mixture in such amounts that the mixture is from about ten to eighty per cent saturated with cuprous chloride vapor. Below the lower limit specified, the cuprous chloride vapor is present in insufficient amount to produce optimum catalytic activity. Above the upper limit specified, there is no gain in activity to compensate for other difficulties that arise in connection with the use of large amounts of cuprous chloride.

In carrying out the invention in connection with the hydrolysis of monochlorbenzene to phenol, cuprous chloride vapor is added to a reaction mixture of monochlorbenzene and steam and this is then passed over a silica gel catalyst. The silica gel may have been previously impregnated with cuprous chloride if so desired, but this is not essential to obtain the results of the invention. The ratio of steam to monochlorbenzene vapor is preferably about 1 to 1. The preferred reaction temperature is about 550° C.

The cuprous chloride vapors may be supplied by passing the initial mixture of steam and monochlorbenzene or either over a bath of molten cuprous chloride. The percentage saturation of the reaction mixture with cuprous chloride may be varied by changing the temperature, or the velocity of the vapors and the extent of the bath. By a proper adjustment of one or more of these factors the amount of cuprous chloride vapor in the reaction mixture is so regulated that it is from ten to eighty per cent of what the mixture would contain if it were saturated with cuprous chloride vapor at the reaction temperature. Cuprous chloride is a rather volatile salt and has a vapor pressure at 550° C. of about three or four millimeters of mercury. Consequently, a gas completely saturated with cuprous chloride vapor, $Cu_2Cl_2$, at this temperature, would hold about one gram of cuprous chloride per mole of gas.

Another method of introducing cuprous chloride vapor into the mixture of steam and monochlorbenzene in the required amount is to first add hydrochloric acid vapors to the mixture and then pass the same over copper or through a copper tube to effect a reaction between the acid and copper, forming cuprous chloride.

Where the cuprous chloride vapors are introduced into the mixture of steam and monochlorbenzene by passing the mixture over molten cuprous chloride, there is some possibility that metallic copper may be deposited upon the silica gel, particularly when the higher concentrations of cuprous chloride vapor are used in the reacting gas mixture. This deposition of copper is undesirable because it results in a gradual diminution of catalytic activity. It can be prevented by making use of another feature of this invention which consists in adding hydrochloric acid to the reaction mixture in sufficient amount to suppress the formation of copper.

The amount of hydrochloric acid necessary to prevent the formation of free metal upon the catalyst bed depends upon the particular metal salt used in the process and the nature of the reacting substances, and upon the temperature at which the reaction is conducted. The amount required for any specific case is readily determined by trial.

The following is a specific example of a run embodying this invention. The reacting mixture contained one mole of steam to one mole of monochlorbenzene vapor and 0.425 gram of cuprous chloride per mole of mixture. The cuprous chloride vapor was added to the reaction mixture by passing this over molten cuprous chloride. The reaction temperature was 551° C. The amount of cuprous chloride vapor present was such that at the reaction temperature the reaction mixture was about 50% saturated with cuprous chloride vapor. A quantity of hydrochloric acid gas sufficient to prevent the deposition of copper under these conditions will be present if the steam is formed by the volatilization of a 0.46 normal solution of hydrochloric acid. This gives a gas mixture which will contain somewhat less than one mole of hydrogen chloride for one hundred moles of water. Since hydrogen chloride is one of the products produced by the reaction between steam and monochlorbenzene vapor, its introduction into the mixture of reacting gases will theoretically have a tendency to render the conversion of monochlorbenzene to phenol less complete than if it were absent, but with the small amounts which are sufficient to suppress the formation of metals on the catalyst bed this effect is small and is far outweighed by the advantages gained through the increased activity of the catalyst and the increased period of time over which the catalyst maintains its activity.

In the example just given the rate of gas flow through the catalyst chamber was such as to give a contact time of 0.5 second. This corresponds to a space velocity of 7200 per hour with the gas volume figured at the reacting temperature; or a space velocity of practically 2400 per hour if the gas volume passing through the catalyst chamber is reduced to 0° C. In one pass over the catalyst about 12% of the monochlorbenzene in the reaction mixture was converted to phenol.

While a temperature of about 550° C. is preferred it is to be understood that the invention is not limited to this temperature and that other suitable temperatures can be used. The exact temperature to be employed at any given time should be determined by a consideration of all of the economic factors of the process at such time, such as the cost of catalyst and equipment, percentage recovery, cost of raw materials, and the like. The space velocity can also be varied over a wide range.

The use of cuprous chloride vapor in amounts which give more than 80% saturation of the reaction mixture at the reaction temperature is less desirable than the use of smaller quantities. When the reaction mixture is more than eighty per cent saturated with cuprous chloride a comparatively small drop in the catalyst temperature will result in the deposition upon it of solid cuprous chloride. Possible difficulties due to this are not compensated for by sufficiently increased catalytic activity.

The yield of phenol is high. A final conversion of monochlorbenzene to phenol of over 90% of the theoretical can be obtained by recirculating the monochlorbenzene that is not converted in a single pass over the catalyst.

By carrying out the conversion of monochlorbenzene to phenol according to the methods of this invention, the catalyst is maintained at a high state of activity except insofar as this is gradually reduced by the deposition of carbon. The carbon deposit ultimately reduces the catalytic activity to such an extent that it becomes desirable to suspend operations for a sufficient time to regenerate the catalyst. This can be done without removing the silica gel from the catalyst chamber. Preferably nitrogen or some other inert gas is first passed through the catalyst chamber at a temperature of about 600° C. to carry off volatile compounds. Air is then passed through the catalyst at a temperature which is preferably somewhat above the reaction temperature to burn off the carbon or tarry material. After this the catalyst is ready for a new run.

The practical life of the catalyst between regenerations is preferably maintained from 5 to 15 hours by controlling the reaction temperature, the purity of the catalyst and of the monochlorbenzene, the space velocity, and the depth of the catalyst bed in accordance with the economic factors of the process. The catalyst life between regenerations may be increased beyond the above by employing lower temperatures or lower space velocities with a resultant lower yield per unit of time. The total life of a single catalyst extends to many regenerations without loss of its activity.

In carrying out the invention, after the gases leave the reaction chamber they are cooled sufficiently to deposit solid cuprous chloride which is recovered and returned to the process without substantial loss. The remaining gases are treated in the vapor phase or are condensed and treated in the liquid phase to separate phenol and the unreacted monochlorbenzene which latter is recirculated through the process. Any suitable method of separation may be used. The hydrochloric acid is recovered from the exit gases and constitutes a by-product of the process.

The invention is claimed as follows:

1. The process of hydrolyzing monochlorbenzene in the vapor phase which comprises passing through a porous silica catalyst bed maintained at a suitable reaction temperature, a mixture of monochlorbenzene vapor and steam, said mixture containing cuprous chloride vapor in excess of an amount obtainable by passing said mixture over heated copper.

2. The process of hydrolyzing an organic halide in the vapor phase which comprises passing through a porous silica catalyst bed maintained at a suitable reaction temperature a mixture of the halide vapor and steam containing cuprous chloride vapor in excess of 10% of the amount required to saturate the mixture at the reaction temperature.

3. The process of hydrolyzing monochlorobenzene in the vapor phase which comprises passing through a porous silica catalyst bed maintained at a suitable reaction temperature, a mixture of monochlorobenzene vapor and steam containing cuprous chloride vapor in excess of 10% of the amount required to saturate the mixture at the reaction temperature.

4. The process of hydrolyzing monochlorobenzene in the vapor phase to produce phenol, comprising mixing the vapors of monochlorobenzene and steam and passing the same over a bath of molten cuprous chloride to produce a vapor mixture containing cuprous chloride in an amount not less than 10% of saturation at the reaction temperature, and thereafter passing the reaction mixture through a porous silica catalyst bed to effect hydrolysis.

5. The process of hydrolyzing monochlorobenzene in the vapor phase to produce phenol, comprising passing a vapor mixture of monochlorobenzene, steam, and hydrogen chloride over a substance containing copper to produce a vapor mixture containing cuprous chloride in an amount not less than 10% of saturation at the reaction temperature, and thereafter passing the reaction mixture through a porous silica catalyst bed at reaction temperature to effect hydrolysis.

6. The process of hydrolyzing monochlorobenzene in the vapor phase to produce phenol, comprising mixing the vapors of monochlorobenzene and of a dilute solution of hydrochloric acid and passing the same over a substance containing copper to produce a vapor mixture containing cuprous chloride in an amount in excess of 10% of saturation at the reaction temperature, and thereafter passing the reaction mixture through a porous silica catalyst bed to effect hydrolysis.

7. In the vapor phase hydrolysis of monochlorobenzene on a silica gel catalyst, the improvement which comprises adding cuprous chloride vapor to the reacting mixture of steam and monochlorobenzene vapor in sufficient quantity to increase the catalytic activity of said silica gel catalyst, and hydrochloric acid gas in sufficient quantity to suppress the deposition of metallic copper on the silica gel catalyst.

8. The method of carrying out a catalytic reaction which comprises mixing the vapors of the substances to be combined together with the vapor of a volatile metal salt possessed of catalytic activity and the vapor of an acid which prevents the deposition upon the catalyst of free metal from the volatile metal salt, and passing the mixture over a porous catalyst bed.

9. The method of making phenol which comprises mixing the vapors of monochlorobenzene and water with the vapor of a volatile metal salt possessed of catalytic activity and the vapor of an acid which prevents the deposition upon the catalyst of free metal from the volatile metal salt, and passing the mixture through a porous catalyst bed.

10. The method of making phenol which comprises mixing the vapors of monochlorobenzene and steam with cuprous chloride vapor, passing the mixture over a porous silica catalyst bed at reaction temperatures, condensing the cuprous chloride from the exit gases and returning the cuprous chloride to the process, separating the phenol from the exit gases, and returning the unreacted monochlorobenzene in the exit gases to the process.

ALBERT W. MEYER.